Nov. 29, 1955 M. A. HYDE ET AL 2,725,552
CONTROL PANEL DISPLAY SYSTEM
Filed July 28, 1951 2 Sheets-Sheet 1
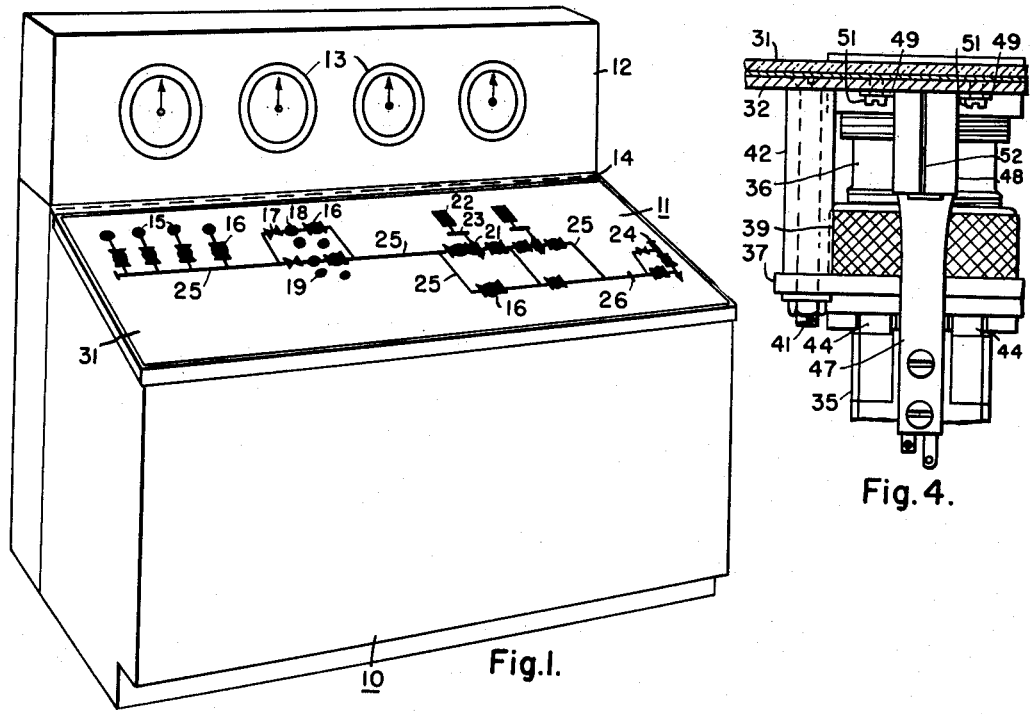
Fig.1.
Fig.4.
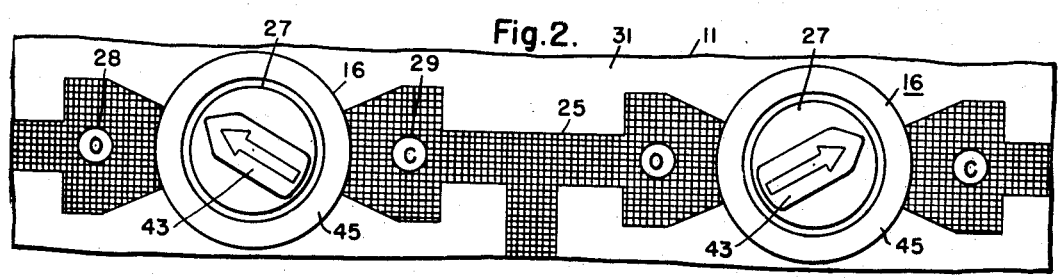
Fig.2.
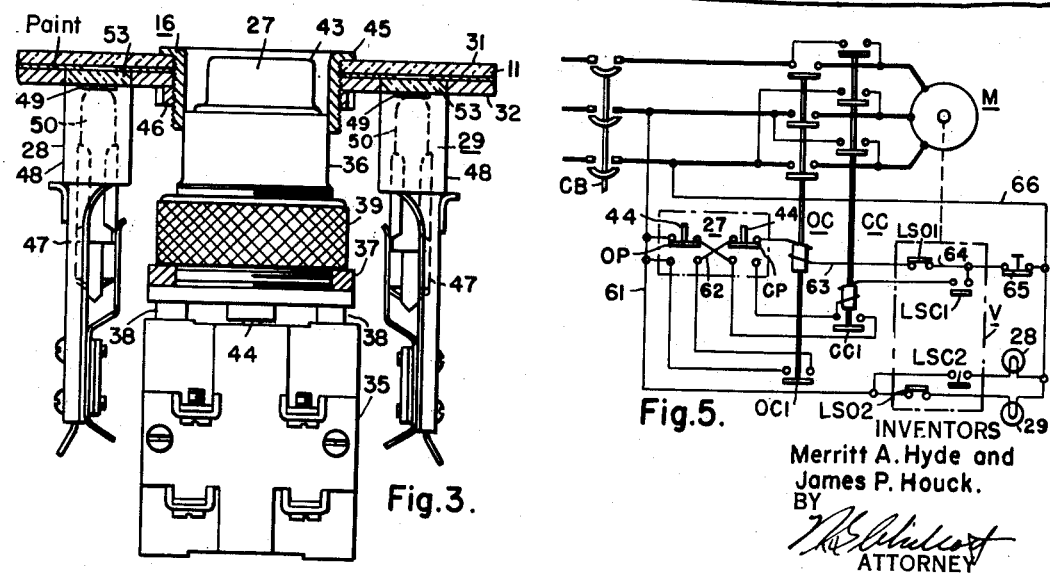
Fig.3.
Fig.5.
INVENTORS
Merritt A. Hyde and
James P. Houck.
BY
ATTORNEY

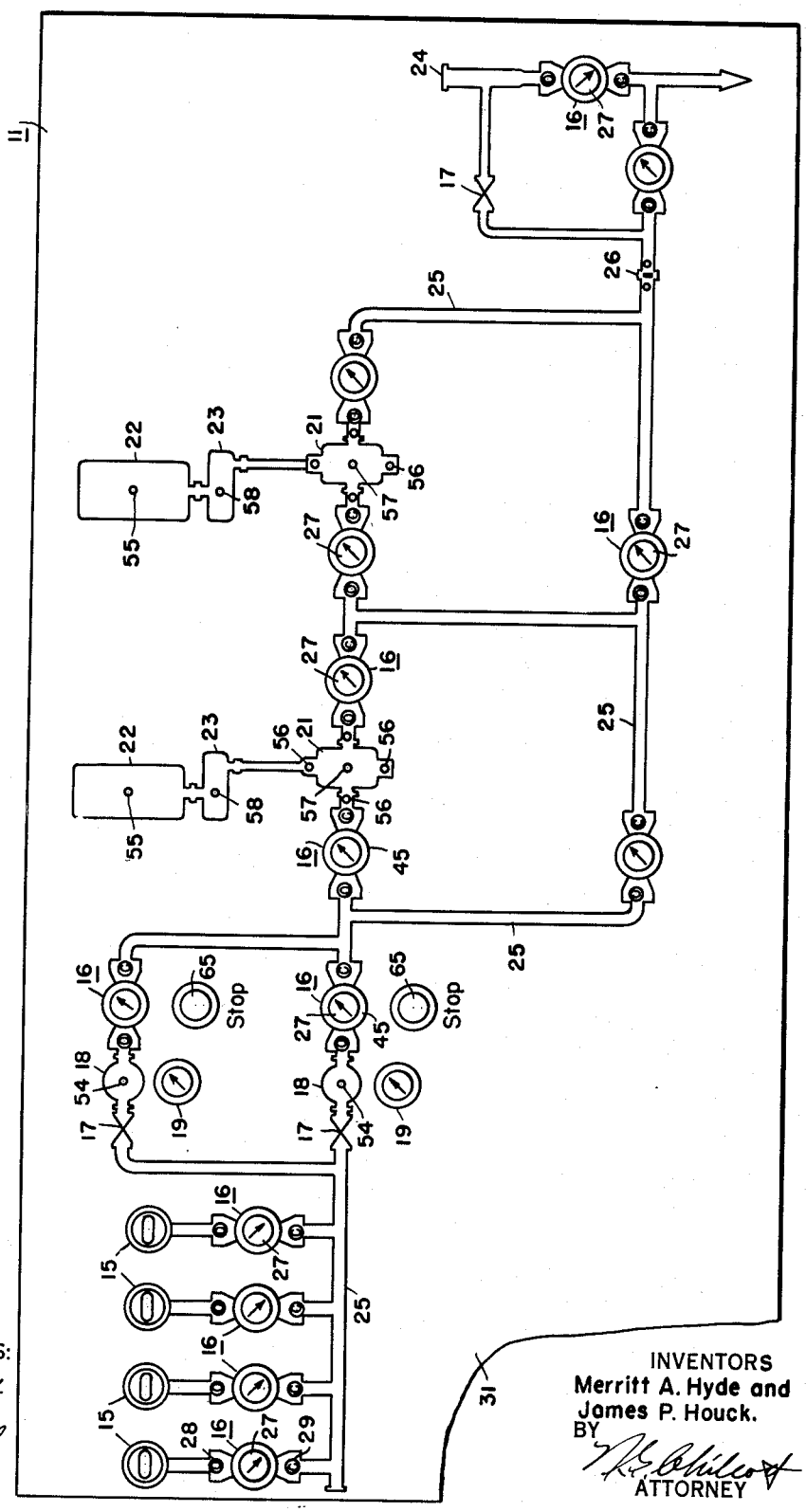

United States Patent Office 2,725,552
Patented Nov. 29, 1955

2,725,552

CONTROL PANEL DISPLAY SYSTEM

Merritt A. Hyde and James P. Houck, Pittsburgh, Pa., assignors to Westinghouse Electric Corporation, East Pittsburgh, Pa., a corporation of Pennsylvania Application July 28, 1951, Serial No. 239,165

5 Claims. (Cl. 340—225)

Our invention relates, generally, to control equipment and, more particularly, to equipment for controlling the operation of motor operated valves and pumps, such as are utilized in pipe line pumping systems.

It is customary to provide control desks or consoles for installation in pumping stations to centralize the control of pipe line pumps and valves. A diagram is provided on the desk comprising symbols of the pumps, pump drivers and motor-operated valves under control, along with interconnecting piping. Indicating lights, showing valve positions and identifying the operation of protective devices, are so located in the proper diagram symbols that the operator can readily and positively associate each light indication with its proper equipment.

It is desirable to extend the practice of mounting control apparatus within the diagram symbols to include operating devices such as push buttons. However, the push buttons heretofore utilized for this type of service are inherently bulky in comparison with the equipment symbols and indicating lights utilized in the desk diagram. Furthermore, these push buttons operate in pairs, such as "Start-Stop," "Open-Close," and the use of two of them with the necessary electrical and mechanical clearances makes it impractical to mount the push buttons within appropriate equipment symbols, and frequently involves such panel space as to interfere with their proper relationship to the diagram. This leads to confusion in terpreting the system and errors in operation. Such errors may be quite costly when it is considered that shutdown of the station and of a complete pipeline may ensue; or that valuable petroleum or petroleum products may be intermixed or contaminated by the misoperation of the valves.

An object of our invention, generally stated, is to provide a control desk and associated apparatus which shall be simple and efficient in operation and which may be economically manufactured and installed.

A more specific object of our invention is to reduce the possibility of errors in controlling the operation of motor-driven valves and pumps.

Another object of our invention is to coordinate control apparatus and apparatus symbols in a control desk.

A further object of our invention is to simplify and improve the control of motor operated valves for a pipeline pumping system.

Other objects of our invention will be explained fully hereinafter or will be apparent to those skilled in the art.

In accordance with one embodiment of our invention, a single push-button assembly having two switch elements disposed for operation selectively by one operating head is mounted in the center of a valve symbol in a pipeline system diagram on a desk top. The valve position indicating lights, which are controlled by limit switches associated with the valve operating mechanism, are mounted one at each side of the push button in the same symbol, and the resultant compact arrangement permits both the operating and the indicating devices for a particular valve to be contained within the symbol. This structure provides convenient identification and increases the reliability of operation of the control system.

For a better understanding of the nature and objects of the invention, reference may be had to the following detailed description, taken in conjunction with the accompanying drawings, in which:

Figure 1 is a view, in perspective, of a control desk embodying the principal features of the invention and showing a typical pumping system diagram;

Fig. 2 is an enlarged view, in plan, of a portion of the desk top;

Fig. 3 is an enlarged view, partly in section and partly in side elevation, of one of the control units utilized in the control desk;

Fig. 4 is an enlarged view, partly in section and partly in end elevation, of the control unit shown in Fig. 3;

Fig. 5 is a diagrammatic view of the control system for one of the motor-operated valves controlled from the control desk, and Fig. 6 is an enlarged view of the system diagram shown in Fig. 1.

Referring to the drawings, and particularly to Fig. 1, the control desk shown therein comprises a base section or compartment 10 which may be constructed in the usual manner, a sloping top 11, and an instrument panel or compartment 12 which is disposed at the rear of and above the top 11. The panel 12 may contain pressure gauges 13 and other instruments usually provided in pipeline pumping stations. As shown, the top 11 may be hinged at 14 to permit the top to be raised to provide access to the bottom side of the top panel.

As explained hereinbefore, it is desirable to provide a system diagram or layout of the pipeline system or pumping station being controlled by means of the control desk. A typical diagram of a pumping station is shown on the top panel 11. This diagram comprises symbols for various pieces of apparatus which are controlled, part of the controlling apparatus, indicating lights for indicating the condition of the symbolized apparatus, and the connecting pipe. A more detailed description of the system diagram will be given hereinafter.

As also explained hereinbefore, considerable difficulty has been experienced in the past in providing control desks which are so constructed and on which the diagram layout is so made that the station operator is enabled to interpret the diagram and operate the system without making errors when controlling the more complicated systems. In order to simplify the construction of the desk and to make the diagram layout more clear, we have devised the present system in which manually operable control switches for controlling the operation of the various pieces of apparatus are incorporated in the symbols for the various pieces of apparatus, thereby making it practically impossible for the operator to misinterpret the diagram layout.

Furthermore, we have simplified the structure and the operation of the control desk by utilizing push-button switch assemblies in which two push-button elements may be selectively operated by means of one operating head which may be rotated to make the desired selection and then depressed to operate the selected contact members of the switch. Thus, the operation of a motor-operated valve, for example, may be controlled by one switch assembly having one set of contact members controlling the opening of the valve and another set for controlling the closing of the valve, both sets being operated by means of a single operating head.

An enlarged view of the present system diagram is shown in Fig. 6. The diagram comprises a plurality of tank symbols 15, motor-operated valve symbols 16, manually-operated valve symbols 17, vertical or booster pump symbols 18, push-button switch assemblies 19 for controlling the pumps 18, horizontal pump symbols 21, engine symbols 22, gear unit symbols 23, a scraper trap symbol 24, interconnecting piping 25, and an orifice flange symbol 26. As indicated, each horizontal pump is driven by an engine through a gear unit. The booster pumps may be driven by electric motors which are controlled by means of the push-button switch assemblies 19. The motor-operated valves are operated by electric motors, the motor for each valve being controlled by a push-button switch assembly 27 which, as explained hereinbefore, is incorporated in the symbol for the valve. Indicating lights 28 and 29 are also incorporated in the valve symbol. The light 28 may indicate that the valve is opened and the light 29 that the valve is closed.

As shown most clearly in Figs. 2 and 3, the desk top 11 comprises a top plate 31 which is composed of a transparent material, such as plastic or glass, and a back-up plate 32 is composed of a non-transparent material, preferably sheet aluminum or steel. The system diagram is interposed between the two plates, as shown in Fig. 3, and is preferably painted on the bottom side of the transparent plate 31. The diagram may be applied in any suitable manner, the various symbols and lines preferably being located and outlined by means of a photographic process, thereby securing the desired degree of accuracy.

Various color schemes may be utilized if desired. As indicated in the present structure, portions of the symbols and the interconnecting piping are black with a white background. Suitable openings are provided in the desk top for mounting the push-button switches, and openings are also provided in the back-up plate 32 for the indicating lights. As shown, portions of the plastic plate are left clear above the indicating lights and colored lenses are placed between the lights and the plastic plate, thereby providing different colors for the different indicating lights.

As shown in Figs. 3 and 4, a control unit for one of the motor-operated valves comprises a push-button switch assembly 27 and indicating lights 28 and 29, all of which are incorporated in the valve symbol 16. The push-button switch assembly 27 comprises a contact housing 35 and an operating head housing 36 which are supported by a mounting plate 37. The contact housing 35 is attached to the housing 36 by screws (not shown) which extend into lugs 38 on the bottom of the cylindrical housing 36. The housing 36 is clamped to the mounting plate 37 by means of a knurled ring 39 which is threaded onto the lower portion of the cylindrical housing 36.

As shown in Fig. 4, the mounting plate 37 is attached to the back-up plate 32 by means of bolts 41 which extend through spacing sleeves 42, thereby so mounting the switch in the desk top 11 that the top of its operating head 43 is flush with the top of the desk. As shown most clearly in Fig. 2, the operating head 43 is generally rectangular and may be shaped like an arrow to indicate the position of the switch.

As explained hereinbefore, the operating head 43 may be rotated to the desired position and then depressed to operate the proper contact members for controlling the operation of the motor which drives the valve. As shown in Fig. 4, two push rods 44, one for each set of contact members extend from the contact housing 35 into the operating housing 36. When the operating head 43 is depressed while in one position, one push rod is depressed to operate one set of contact members. When the operating head is depressed while in the other position, the other push rod is depressed to operate the other set of contact members. The switch is so constructed that the operating head can not be depressed while in an intermediate position between the two operating positions.

The contact members of the switch are so constructed that the motion of each push rod causes an upper set of contact members to open at the beginning of the stroke and a lower set of contact members to be closed at the end of the stroke. This arrangement permits cross connecting of the open and the close contactor control circuits so as to cause interrupting of one circuit before making the other, thereby obtaining electrically interlocked control of the two contactors which control the operation of the motor, as will be explained more fully hereinafter.

As shown most clearly in Fig. 3, a metal trim ring 45 is mounted in the opening in the desk top 11 for each push-button switch assembly. The ring 45 is secured in place by a lock nut 46 which also functions to hold the plastic plate 31 and the back-up plate 32 together. As shown in Fig. 3, the top of the operating head 43 is substantially flush with the top of the desk 11 and is slightly below the top of the trim ring 45, thereby preventing accidental operation of the push-button switch. Sufficient space is provided between the head 43 and the sides of the ring 45 to permit the head to be grasped by the operator to rotate the head to the desired position.

As shown in Figs. 3 and 4, each indicating light comprises a bulb 50 which is mounted in a receptacle 47 which may be of the type utilized on telephone switchboards and is removably attached to the back-up plate 32. The receptacle 47 is supported by means of a cylindrical sleeve 48 having a pair of oppositely disposed ears 49 as shown in Fig. 4. The ears 49 are attached to the back-up plate 32 by means of screws 51. A slot 52 is provided in one side of the sleeve 48, thereby permitting the sleeve to spring open slightly to receive the receptacle 47. In this manner, the receptacle 47 is retained in the sleeve 48 by friction. In case it is necessary to replace the bulb 50, the receptacle 47 may be removed from the plate 32 without removing the screws 51 and the sleeve 48.

As explained hereinbefore, a colored lens 53 may be provided for covering the bulb 50. The lens 53 is placed over the bulb 50 in an opening provided in the back-up plate 32 and is retained in position by the sleeve 48. As explained hereinbefore, a clear space is left in the symbol for each indicating light, thereby permitting the color on the lens to show through the plastic top. As shown, suitable letters, such as "O" and "C" may be provided in the symbol over the indicating lights, if desired.

As shown in Fig. 6, indicating lights may be provided for the other apparatus symbols to indicate the operation and the condition of the apparatus. Thus, a light 54 may be provided in the symbol 18 for each one of the booster pumps to indicate when the pump is in operation. The push-button switch 19 which controls the operation of the booster pump is similar in construction and operation to the bush-button switch assembly 27 for controlling a valve motor. As shown in Fig. 6, each push-button switch 19 is located adjacent to the symbol for its respective booster pump. If desired, the switch assembly 19 may be incorporated in the assembly for the booster pump in the same manner as is the switch assembly for a motor-operated valve.

Likewise, suitable indicating lights may be provided in the symbols for the other pieces of apparatus. Thus, a light 55 may be provided in the symbol 22 for an engine to indicate that the engine is in operation. Also, indicating lights 56 may be provided in the symbol 21 for a horizontal pump to indicate the condition of the bearings for the pump. In this manner, a warning may be given of an overheated bearing. Indicating lights 57 and 58 may be provided for the symbols 21 and 23, respectively, to indicate that the pump and the gear unit are in operation.

The operation of the apparatus may be more clearly understood by referring to Fig. 5 which is a diagram for a typical control unit for controlling the operation of a motor-operated valve V. As shown in Fig. 5, power for a motor M may be supplied from any suitable source through a circuit breaker CB. The direction of operation of the motor M is controlled by contactors OC and CC. The operation of the contactors OC and CC is, in turn, controlled by a push-button switch assembly 27 having contact members OP and CP which, as explained hereinbefore, are operated by push rods 44. The valve mechanism V is provided with limit switches having contact members LSO1 and LSO2 which open only when the valve is fully opened and contact members LSC1 and LSC2 which are opened only when the valve is fully closed. The valve is shown in the closed position.

If it is desired to open the valve, the push-button switch 27 is rotated to the open position and then depressed to operate the contact members OP. When the contact members OP are in their lowermost position, a circuit is established from the conductor 61 through the contact members OP, conductor 62, contact members CP which are in their uppermost position, the coil of the contactor OC, conductor 63, limit switch LSO1, conductor 64 and a push-button switch 65 to a line conductor 66. In this manner, the contactor OC is closed to operate the motor M in a direction to open the valve. The push-button switch 27 may be released as soon as the contactor OC is closed as a holding circuit for the contactor OC is established through auxiliary contacts OC1 on the contactor.

When the valve is fully opened, the limit switch LSO1 is opened to cause the opening of the contactor OC, thereby stopping the motor M. The limit switch LSO2 is also opened to deenergize the indicating light 29. At this time the contacts for the limit switches LSC1 and LSC2 are closed. The indicating light 28 is energized through the switch LSC2 and the switch LSC1 is closed to permit the closing of the contactor CC when the contact members CP are operated by means of the push-button switch 27 in the manner previously described. Thus, the motor may be controlled to operate the valve in either direction.

The provision of the "Stop" push button 65, which may be of the usual type in which the contact members are closed by a spring and opened by depressing the push button, permits the motor M to be stopped to hold the valve V at any desired intermediate position between its fully opened and fully closed positions. It will be seen that the opening of the push button 65 deenergizes either one of the contactors OC or CC, thereby stopping the motor at any time during the operation of the valve.

Furthermore, the provision of the auxiliary contact members OC1 and CC1 and the cross connecting of the contact members on the push-button switch 27 permits the reversal of the motor M at any time during its operation without it being necessary to allow the valve V to complete its full travel in one direction before a reversal can be made. Thus, the operation of the contact members CP while the motor is being operated to open the valve will interrupt the holding circuit for the contactor OC, thereby causing this contactor to open and will also establish an energizing circuit for the contactor CC to cause the motor to operate in the reverse direction to close the valve. In this manner, considerable time may be saved if conditions are such that it is desired to reverse the operation of a valve before it has completed its full travel in any one direction.

As explained hereinbefore, push-button switch assemblies 19 which are similar in construction and operation to the assemblies 27 may be utilized to control the operation of the booster pumps represented by the symbols 18. The push-button switches 19 may be utilized to start and stop the motors which drive these pumps in the same manner as the push-button switches 27 are utilized to open and close the motor-operated valves. Since the pump motors are required to operate in only one direction, only one contactor will be required to control the motor and the other reversing contactor and the limit switches may be omitted. Otherwise, the connections for a pump motor are similar to those shown in the diagram in Fig. 5.

From the foregoing description, it is apparent that we have provided a structure which permits the operating and indicating devices for a particular piece of apparatus to be incorporated in the diagram symbol for that apparatus, thereby providing convenient identification and increasing the reliability of operation since the possibility of the operator making mistakes is reduced. The present structure is particularly advantageous in control systems involving complicated piping arrangements with a multiplicity of valves. The present structure makes it possible to control the operation of a large number of valves or other apparatus without being required to provide a desk of unusual and unwieldy proportions.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a control desk, in combination, a desk top, a system diagram on the desk top, said diagram comprising apparatus symbols and interconnecting lines, push-button switches in the apparatus symbols, each switch comprising a single direction-pointing head for selectively operating any one of a plurality of independently operable contact members which control a plurality of operations of the apparatus unit corresponding to the symbol in which the switch head is located, said head being centrally disposed in and constituting a part of the symbol for the apparatus unit which it controls, said head being rotatable through its entire angular movement without actuating any one of the contact members of the switch, and indicating lights in said symbol for indicating selectable operations of the symbolized apparatus unit controlled by the switch head in said symbol, said switch being so constructed that the head must first be rotated towards an indicating light in said symbol to select the desired operation of the apparatus unit and then depressed to effect the selected operation corresponding to the light towards which the head points.

2. In a control desk, in combination, a desk top, a system diagram on the desk top, said diagram comprising apparatus symbols and interconnecting lines, push-button switches in the apparatus symbols, each switch comprising a single rotatable and depressible direction-pointing head for selectively operating different contact members to control a plurality of operations of the apparatus unit corresponding to the symbol in which the switch head is located, said head being centrally disposed in and constituting a part of the symbol for the apparatus unit which it controls, said head being rotatable through more than 90° without actuating any one of the contact members of the switch, and indicating lights in said symbol on opposite sides of the switch head for indicating selectable operations of the symbolized unit controlled by the switch head in said symbol, said switch being so constructed that the head must first be rotated towards an indicating light in said symbol to select the desired operation of the apparatus unit and then depressed to effect the selected operation corresponding to the light towards which the head points.

3. In a control desk, in combination, a desk top, a system diagram on the desk top, said diagram comprising apparatus symbols and interconnecting lines, push-button switches in the apparatus symbols, each switch comprising a single rotatable and depressible direction-pointing head for selectively operating different contact members to control a plurality of operations of the apparatus unit corresponding to the symbol in which the switch head is located, said head being rotatable without actuating any one of the contact members of the switch, said head being disposed substantially flush with the top of the desk in the symbol for the apparatus unit which it controls, and indicating lights in said symbol in close proximity to the switch head for indicating selectable operations of the symbolized apparatus unit controlled by the switch head in said symbol, said switch being so constructed that the head must first be rotated towards an indicating light in said symbol to select the desired operation of the apparatus unit and then depressed to effect the selected operation corresponding to the light towards which the head points.

4. In a control panel, in combination, a system diagram comprising apparatus symbols and interconnecting lines, push-button switches disposed in the panel at said apparatus symbols, each switch comprising a single rotatable and depressible head disposed in one of the apparatus symbols for selectively operating contact members to control a plurality of operations of the apparatus unit corresponding to the symbol in which the switch head is located, said head being rotatable without actuating any one of the contact members of the switch, and indicating lights associated with the switch head for indicating selectable operations of the symbolized apparatus unit controlled by the switch head in said symbol, said switch being so constructed that the head must first be rotated in the direction of an indicating light to select the desired operation of the apparatus unit and then depressed to effect the selected operation corresponding to the light towards which the head is directed.

5. In a control panel, in combination, a system diagram comprising apparatus symbols and interconnecting lines, push-button switches disposed in the panel at said apparatus symbols, each switch comprising a single rotatable head disposed in one of the apparatus symbols for selectively operating contact members to control a plurality of operations of the apparatus unit corresponding to the symbol in which the switch head is located, said head being rotatable through its entire angular movement without actuating any one of the contact members of the switch, the switch head being disposed in the symbol for the controlled unit substantially flush with the top surface of the panel, and indicating lights disposed on opposite sides of the switch head for indicating selectable operations of the symbolized apparatus unit controlled by the switch head in said symbol, said switch being so constructed that the head must first be rotated in the direction of an indicating light to select the desired operation of the apparatus unit and then depressed to effect the selected operation corresponding to the light towards which the head is directed, said light being energized upon the completion of the selected operation.

References Cited in the file of this patent

UNITED STATES PATENTS

| | | |
|---|---|---|
| 831,404 | Ball | Sept. 18, 1906 |
| 1,408,611 | Larner | Mar. 7, 1922 |
| 2,094,134 | Obergfell | Sept. 28, 1937 |
| 2,305,185 | Merkel | Dec. 15, 1942 |
| 2,359,110 | Hudson et al. | Sept. 26, 1944 |
| 2,496,853 | Burns | Feb. 7, 1950 |
| 2,507,921 | Merkel | May 16, 1950 |

FOREIGN PATENTS

| | | |
|---|---|---|
| 150,824 | Switzerland | Nov. 15, 1931 |
| 215,260 | Switzerland | Sept. 16, 1941 |
| 411,770 | Great Britain | June 14, 1934 |

OTHER REFERENCES

Serial No. 412,280, Moulet (A. P. C.), published June 8, 1943.